US005828891A

United States Patent [19]
Benayoun et al.

[11] Patent Number: 5,828,891
[45] Date of Patent: Oct. 27, 1998

[54] MULTILEVEL INTERRUPT DEVICE

[75] Inventors: Alain Benayoun, Cagnes Sur Mer; Jean-Francois Le Pennec, Nice; Patrick Michel, La Guade, all of France

[73] Assignee: International Business Machines Corporation, Armonk, N.Y.

[21] Appl. No.: 766,689

[22] Filed: Dec. 13, 1996

[30] Foreign Application Priority Data

Dec. 20, 1995 [EP] European Pat. Off. .............. 95480188

[51] Int. Cl.$^6$ ...................................................... G06F 9/46
[52] U.S. Cl. ............................................ 395/742; 395/739
[58] Field of Search ..................................... 395/733–742, 395/387

[56] References Cited

U.S. PATENT DOCUMENTS

| | | | |
|---|---|---|---|
| 4,648,029 | 3/1987 | Cooper et al. | 364/200 |
| 4,768,149 | 8/1988 | Konopik et al. | 364/200 |
| 4,788,639 | 11/1988 | Tamaru | 395/739 |
| 5,261,107 | 11/1993 | Klim et al. | 395/725 |
| 5,381,541 | 1/1995 | Begun et al. | 395/700 |
| 5,481,728 | 1/1996 | Matsutani | 395/293 |

FOREIGN PATENT DOCUMENTS 0104545 4/1984 European Pat. Off. .......... G06F 3/04

OTHER PUBLICATIONS

IBM Technical Disclosure Bulletin, vol. 33, No. 9 Feb. 1991 "Single Line Interrupt to Microprocessor", pp. 179–181.

*Primary Examiner*—Ayaz R. Sheikh
*Assistant Examiner*—David A. Wiley
*Attorney, Agent, or Firm*—Joscelyn G. Cockburn

[57] ABSTRACT

The invention relates to multilevel interrupt device (10) using a common microprocessor interrupt signal (101) to process interrupt signals (INT1, . . . , INTN) received from N peripheral chips. This device (10) is connected to a microprocessor (100) and N peripheral chips (200,210,230) through data/address busses (108,110) and it is also connected to a memory (150) by an additional bus (112). An interrupt operation starts when any one of the peripheral chips activates an interrupt signal through OR gate (220) detected by the microprocessor. The invention avoids to involve the microprocessor in the determination of the interrupt requester except for the generation of a common start_address decoded by logic (180) for starting interrupt operations and a common end_address decoded by logic (190) for ending it. Owing to the start_address and the interrupt signals (173,174) received, latch (170) generates a translated address to memory (150) through a multiplexer (160) to start the corresponding interrupt routine stored at this translated address. The activation of any one of the peripheral chips leads to the reading of the corresponding interrupt routine stored in the memory without requiring any action of the microprocessor. The number of interrupt routines depends on the possible combinations of the N interrupt signals.

6 Claims, 12 Drawing Sheets

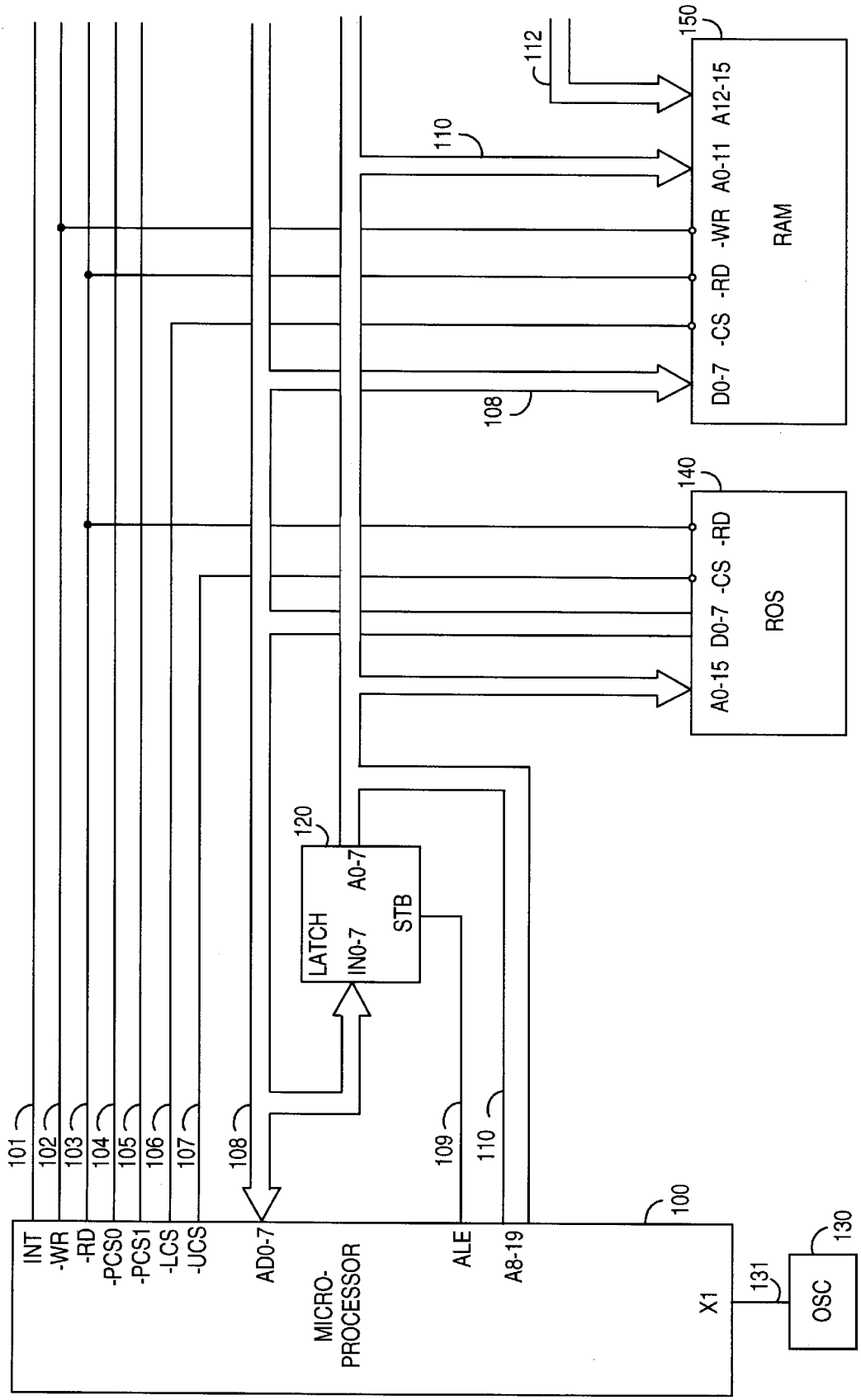
FIG. 3-A

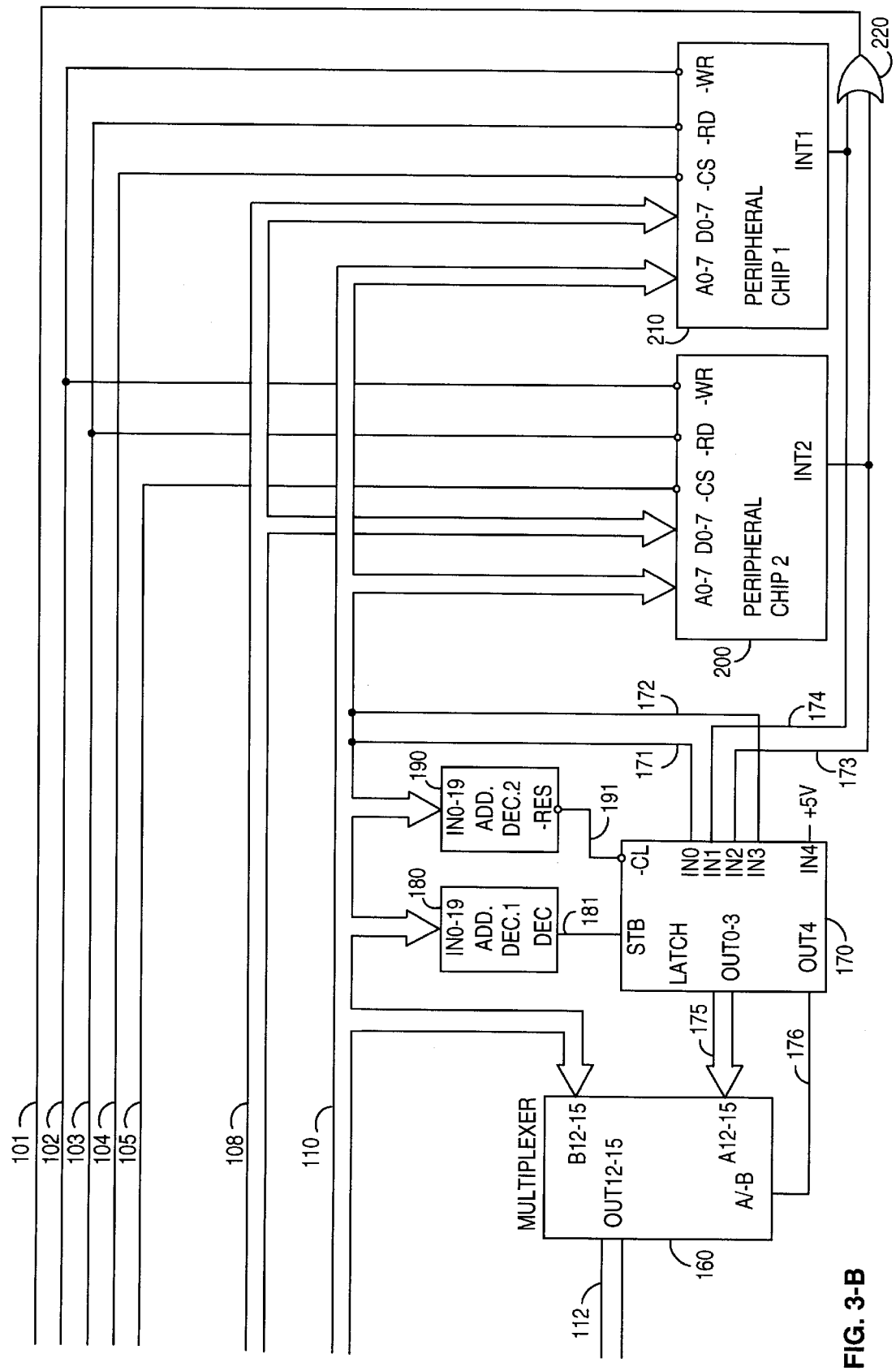
FIG. 3-B

| MICROPROCESSOR ADDRESS BUS | PERIPHERAL CHIP 1 INTERRUPT ACTIVE | PERIPHERAL CHIP 2 INTERRUPT ACTIVE | MEMORY ADDRESS BUS |
|---|---|---|---|
| XXXXX | NO | NO | XXXXX |
| 01XXX | YES | NO | 03XXX |
| 01XXX | NO | YES | 05XXX |
| 01XXX | YES | YES | 07XXX |

MULTILEVEL INTERRUPT DEVICE

TECHNICAL FIELD OF THE INVENTION

The present invention relates to a data communication system and more particularly to a multilevel interrupt device for sharing a common interrupt line by a plurality of input/output devices.

BACKGROUND ART

A microprocessor uses I/O devices to communicate with its external interfaces. Usually, a peripheral chip communicates with the microprocessor through its interrupt signal. When the peripheral chip has an information to report or to ask, it activates its interrupt signal to alert the microprocessor.

The U.S. Pat. No. 5,261,107 discloses a programmable interrupt controller having a plurality of inputs connected to receive interrupt requests from a group of peripheral devices and an interrupt request output connected to a central processing unit including means for interrupting the CPU over the interrupt request output and a priority resolver for assigning a priority position to each of the interrupt request to create an interrupt priority hierarchy. The problem solved by the document is not the same as the present invention since the microprocessor has to read the status register within the programmable interrupt controller to determine the requester to be served.

Another U.S. Pat. No. 4,648,029 discloses a multiplexed interrupt/DMA request arbitration apparatus and method. This arbitration device selects among contending requesters on a priority basis and generates a grant signal interpreted by the requesting devices either as an interrupt grant or a bus grant depending upon whether or not an interrupt acknowledge signal is received. A single interrupt grant/bus grant multi-wire signal cable connects the arbitration device to individual requesters. Interrupt requests from the requesters are ORed together and simultaneously presented to a central controlling microprocessor. The arbitration device determines which requestor will be granted access and under control of the central control microprocessor, the arbitrator gates an interrupt grant or a DMA grant signal to the device selected the arbitration mechanism. However, this invention is based on an arbitration device and an interrupt grant signal generated by the microprocessor to each requester whereas this is omitted in our invention.

The U.S. Pat. No. 4,768,149 discloses a system for managing a plurality of shared interrupt handlers in a linked-list data structure for servicing a plurality of input/output devices sharing a common interrupt line in a microcomputer. The system provides for an orderly method to link a newly loaded interrupt handler routine into a linked_list data structure. Each interrupt handlers routine has a control block portion for storing a pointer address to the beginning of the instruction portion of the next interrupt handler routine. Moreover, the microprocessor executes the status determination from this instruction portion of the interrupt handler routines to determine the requester. However, in our invention, the microprocessor does not search the requester to execute the interrupt routine which is automatically selected by hardware at the memory level without the intervention of the microprocessor.

SUMMARY OF THE INVENTION

Therefore, it is an object of the invention to devise a multiple interrupt device which avoids to involve a microprocessor into the determination of an interrupt requester.

It is also an object of the invention to connect as many input/output devices as necessary in the data communication system.

Another object of the present invention is to propose a multiple interrupt device for enabling a plurality of input/output devices to share a common interrupt line.

Furthermore, the interrupt handler routines used in the present invention do not require control blocks which occupy space in memory.

To perform the above object, the interrupt device according to the present invention implements a hardware which automatically routes the microcode to the appropriate input/output interrupt routine without requiring any microprocessor's action. In a data communication system comprising a number N of Input/Output devices sharing a common interrupt line, a microprocessor and a memory containing a plurality of interrupt routines, all connected by data/address bus, the interrupt device receiving interrupt signals from each of the I/O devices on interrupt lines comprises:

interrupting means for receiving any one of the interrupt signals from the I/O devices to interrupt the microprocessor and getting a start_address of an interrupt operation from the memory;

a first address decoding means decoding the start_address (01000H) on address bus for generating a decoding signal (DEC);

a second address decoding means decoding an end_ address (01010H) of the interrupt routines from the memory for generating a resetting signal (RES);

an interrupt control means responsive to any one of the interrupt signals and to the decoding signal for generating a select signal and a translated address on a translated address bus for initializing the corresponding interrupt routines, and responsive to the resetting signal for resetting the translated address bus for ending the interrupt routines; and switching means responsive to the select signal for switching between the translated address received on the translated address bus and unchanged microprocessor address received on address bus so as to transmit it to the memory to read the interrupt routine at the translated address or the microprocessor address.

BRIEF DESCRIPTION OF THE DRAWINGS

FIGS. 3A and 3-B represent in detail the device in a particular case of two connected peripheral chips.

DETAILED DESCRIPTION OF THE PRESENT INVENTION

Figure 1:
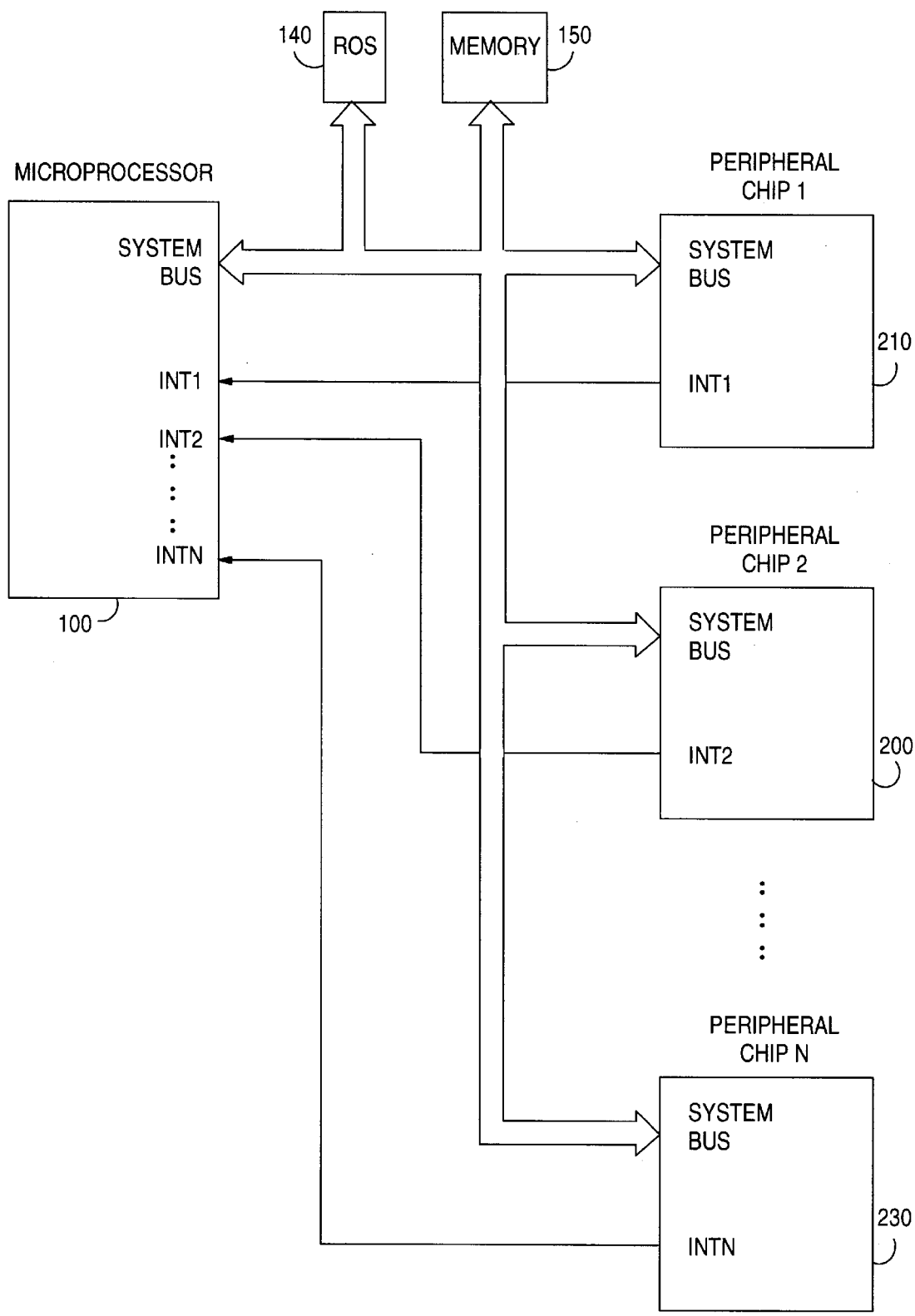
FIG. 1 shows the implementation of a micro-processor using a plurality of interrupt I/O as in the prior art.

An ideal but unreal hardware architecture of an electronic design based on a microprocessor (100) connected through a data and address bus to a memory (150), a read only memory ROS (140) and N peripheral chips (200,210,230) is given in FIG. 1. The N peripheral chips respectively have their interrupt signal outputs (INT1, . . . , INTN) connected to the N interrupt signal inputs (INT1, . . . , INTN) of microprocessor (100). In fact, this situation cannot be implemented because of the limited number of interrupt signal inputs of the microprocessor. Indeed, the case of 3 or 4 peripheral chips is often encountered in the prior art.

Figure 2:
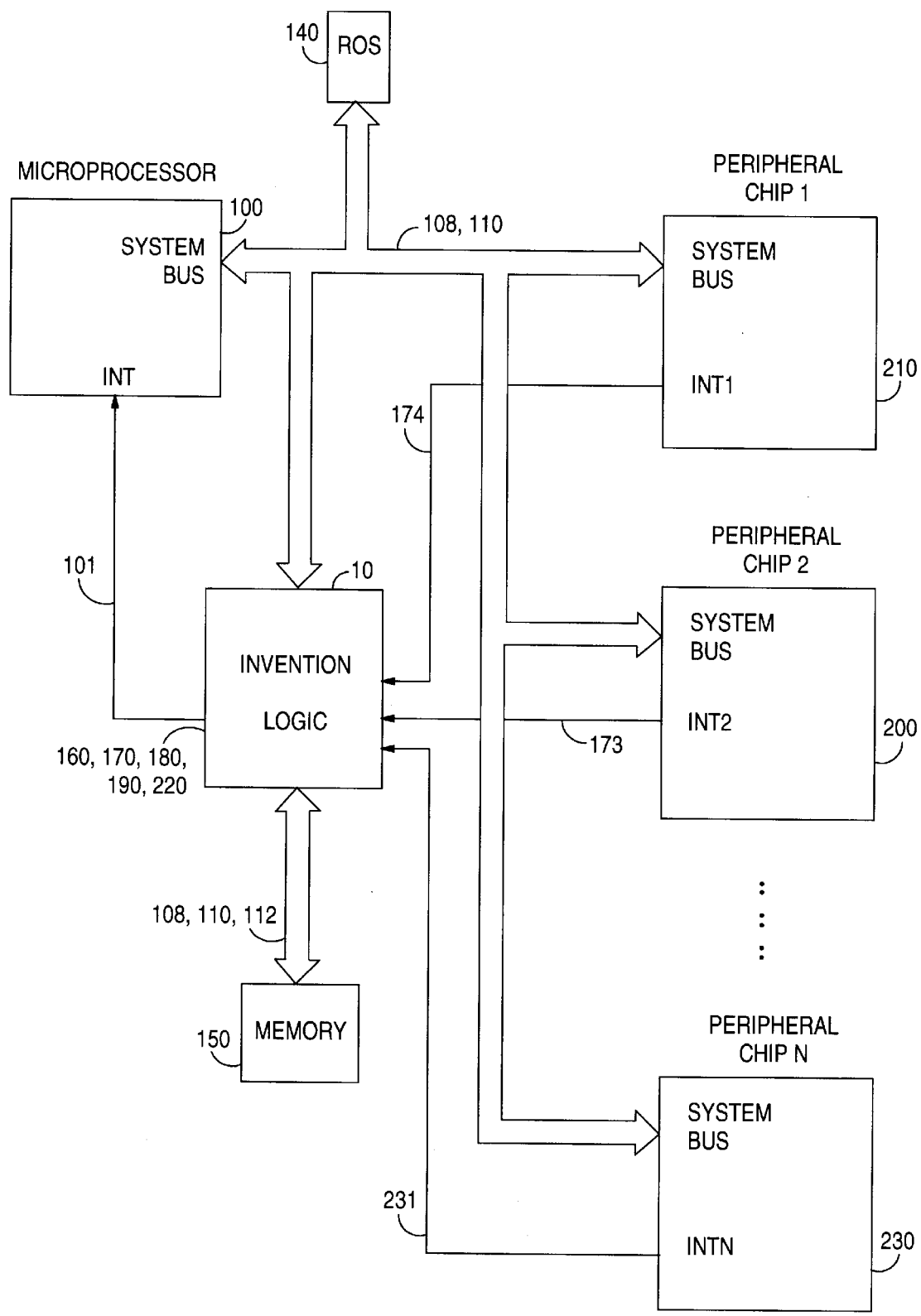
FIG. 2 shows the implementation of a device according to the present invention connected to a micro-processor and generating a single interrupt I/O.

FIG. 2 shows the architecture of the same previous hardware configuration wherein a device (10) according the present invention is to be implemented. With this device, only one microprocessor interrupt signal (101) is required to interface as many N peripheral chips signals (INT1, . . . , INTN) received by the device (10) as it is necessary. The device (10) according to the present invention is connected to a microprocessor (100), a ROS (140) and N peripheral chips (200,210,230) through data/address busses (108,110) and it is also connected to a memory (150) by an additional bus (112) shown in FIGS. 3-A and 3-B.

From a software standpoint, microprocessor (100) considers the N peripheral chips as a single peripheral chip.

HARDWARE DESCRIPTION OF THE INVENTION

The hardware architecture using the present invention is illustrated in the set of FIGS. 3-A and 3-B. For ease of comprehension, this hardware architecture is based on two peripheral chips and one microprocessor interrupt input. But one may generalize to a number of N peripheral chips as this case will also be described.

An input interrupt pin INT of the microprocessor (100) is connected through lead (101) to an output lead of an OR gate (220). One input lead of OR gate (220) is connected to an output interrupt pin INT1 of a first peripheral chip (210) through lead (174). This lead (174) is also connected to an input pin IN1 of a latch (170) of the type 74ALS273. A second input of OR gate (220) is connected to an output interrupt pin INT2 of a second peripheral chip (200) through a lead (173). This lead (173) is also connected to an input pin IN2 of the latch (170).

An output write pin -WR, of microprocessor (100) is connected through lead (102) to a write input, pin -WR, of a Random Access Memory RAM (150) of the type 64K×8 in this example, to a write input, pin -WR, of peripheral chip (200) and to a write input, pin -WR, of peripheral chip (210).

A read output, pin -RD, of microprocessor (100) is connected through lead (103) to a read input, pin -RD, of a read only storage ROS (140) of the type 64K×8 for this example, to a read input, pin -RD, of RAM (150), to a read input, pin -RD, of peripheral chip (200) and to a read input, pin -RD, of peripheral chip (210).

Two peripheral_chip_select outputs, pins -PCS0 and -PCS1, of microprocessor (100) are respectively connected through leads (104,105) to chip_select inputs, pins -CS, of peripheral chips (210,200).

A local_chip_select output, pin -LCS, of microprocessor (100) is connected through lead (106) to a chip_select input, pin -CS, of RAM (150). In the same way, an upper_chip_select output, pin -UCS, of microprocessor (100) is connected through lead (107) to a chip_select input, pin -CS, of ROS (140).

An address_strobe output, pin ALE, of microprocessor (100) is connected though lead (109) to a strobe input, pin STB, of a latch (120) of the type 74ALS373.

A clock input, pin X1, of microprocessor (100) is connected through lead (131) to an output of an oscillator (130) providing a free-running clock.

A bidirectional address_data bus (108) is connected to pins AD0–7 of microprocessor (100) and to pins IN0–7 of latch (120), to an output data bus, pins D0–7 of ROS (140), to a bidirectional data bus, pins D0–7 of RAM (150), to a bidirectional data bus, pins D0–7 of peripheral chip (200) and to a bidirectional data bus, pins D0–7 of peripheral chip (210).

An output bus, pins A0–7 of latch 120 is associated with an output address bus, pins A8–19, of microprocessor (100) and referred as an output address bus A0–19, bus (110) in the following description.

Pins A0–15 of the output address bus (110) is connected to an input address bus, pins A0–15 of ROS (140). In the same ways, pins A0–11 of bus (110) is connected to an input address bus, pin A0–11, of RAM (150). Output address bus (110) is connected to bus inputs, pins IN0–19, of address_decode_1 and address_decode_2 logic (180,190). And pins A0–7 of the output address bus (110) is connected to an input address bus, pins A0–7, of peripheral chips (200,210). Besides, pins A12–15 of bus (110) is connected to an input port, pins B12–15 of a multiplexer (160). Input pins IN0 and IN3 of latch (170) are respectively connected through leads (171,172) to address outputs A12 and A15 of bus (110).

Output bus, referred as OUT0–3, of latch (170) is connected through bus (175) to a second input port, pins A12–15 of multiplexer (160) whereas its output bus referred as OUT12–15 is connected through bus (112) to an address bus input, pins A12–15 of RAM (150). Its input port_select, pin A/-B is connected through lead (176) to an output pin OUT4 of latch (170) whose input pin IN4 is connected to a reference voltage which for example+5V. Latch (170) also has its strobe input pin STB, connected through lead (181) to an output pin DEC of address_decode_1 logic (180) and its clear input pin -CL connected through lead (191) to an output pin -RES, of address_decode_2 logic (190).

Figure 11:
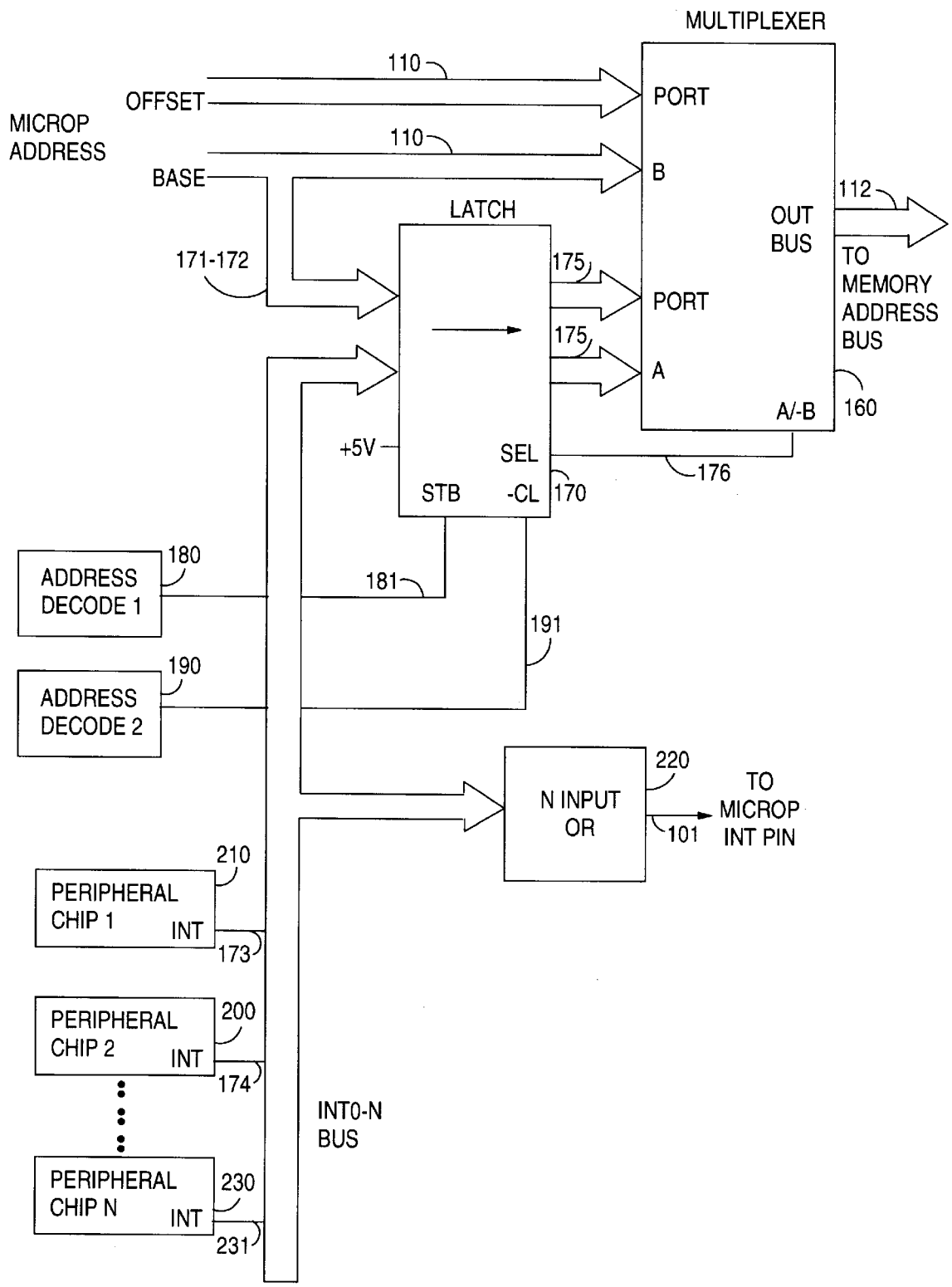
FIG. 11 shows the device according to the present invention using a number N of peripheral chips.

The case of N connected peripheral chips is shown in FIG. 11. The multiplexer (160), the latch (170), the address decode 1 and 2 (180,190) and the OR gate (220) remains unchanged functionally but their size have increased. The OR gate (220) has N input pins. The latch (170) has a fixed base address (171–172) which may have more than two wires and N additional offset bits (173–174) corresponding to N interrupt signals. The multiplexer (160) is responsive to the select signal (176) for switching between ports B and A. Port B receives a base bus plus an offset bus (110) from the microprocessor whereas port A through bus (175) to latch (170). The width of busses (110,175,112) are dependent on the number N of connected peripheral chips. The address decode 1 and 2 (180,190) remain unchanged.

FUNCTIONAL DESCRIPTION OF THE INVENTION

Figure 4:
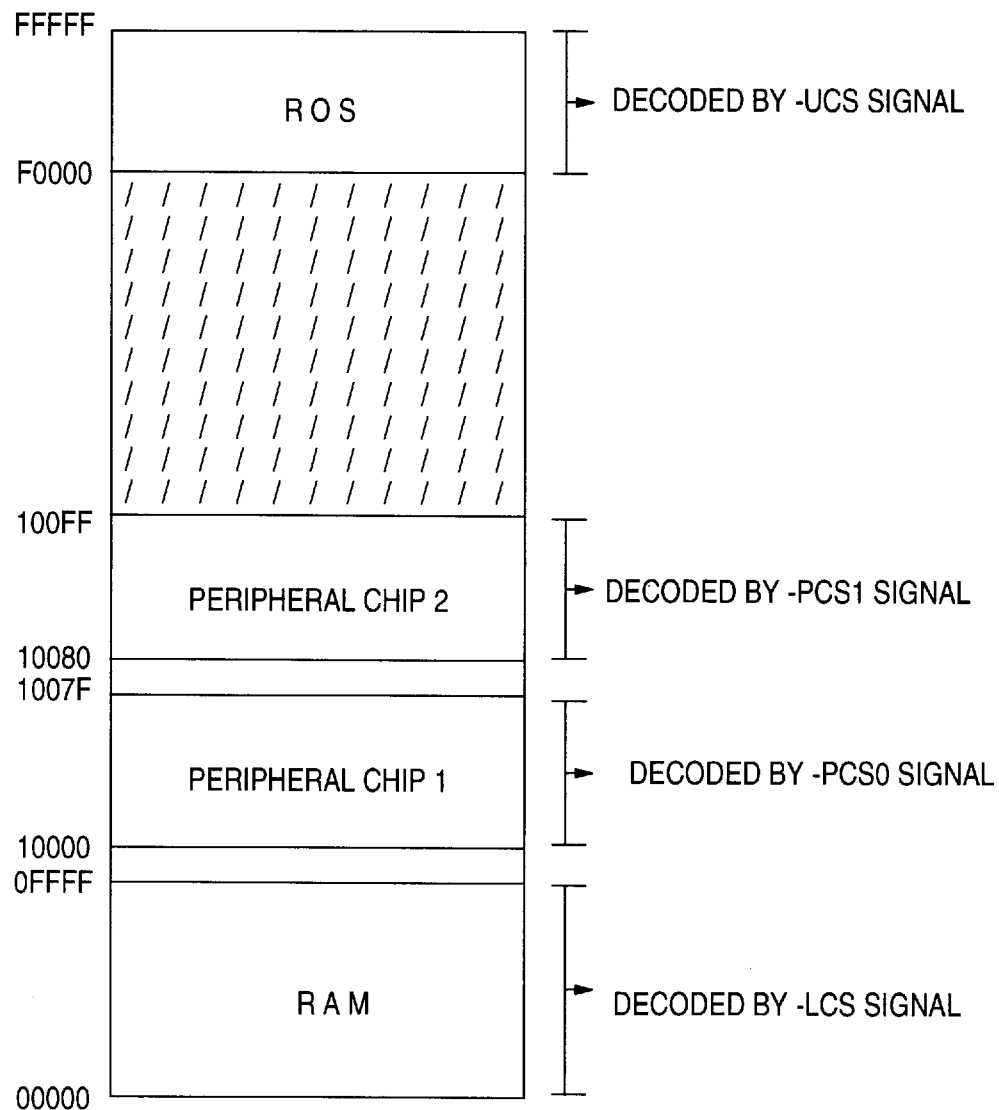
FIG. 4 represents a memory map according to the present invention.

The memory map of microprocessor (100) is shown in FIG. 4.

In our example where two peripheral chips (200,210) are used, four address ranges are defined: 64Kbytes for the RAM (150), 256 bytes for peripheral chip 1 and 2 (210,200), and 64Kbytes for ROS (140).

In case of N peripheral chips, we will require N×256 bytes, one area per peripheral chip, the RAM and ROS remain unchanged.

A microprocessor interrupt vector (the address in the memory read by the microprocessor when it receives a hardware interrupt) along with interrupt routines (one for each peripheral chip) are located in the RAM. When microprocessor (100) receives a hardware interrupt, it reads the interrupt vector and executes the code whose address was previously stored in the interrupt vector. This address is called start_address. The purpose is to dynamically modify this start_address at the memory physical level without informing the microprocessor. The start_address as is used in the present invention is derived from the state of the interrupt signal of each peripheral chip.

Figure 5:
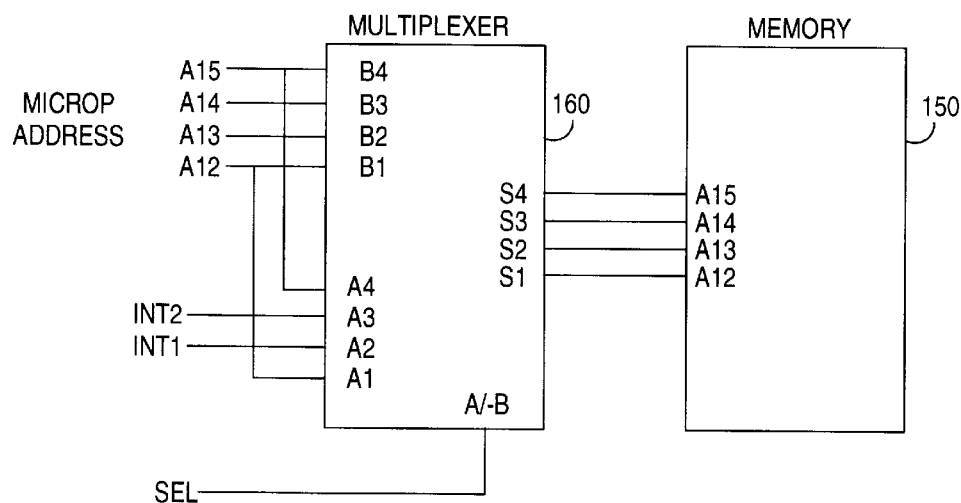
FIG. 5 represents a memory access table of the device to be read in connection with the I/O of the multiplexer and memory in the case of two connected peripheral chips.

FIG. 5 describes a memory access table to modify dynamically the start_address. For ease of comprehension, let's assume that the microprocessor interrupt vector is loaded with address 01000H (meaning the address bit A12 is equal to 1), it may be any other value. The translation mechanism of the memory address is as follows:

if no interrupt signal is activated, the memory address bus (112) receives four bits of the microprocessor address bus (110);

if the interrupt signal of peripheral chip 1 (210) is activated, the memory address bus (112) does not receive the four bits of the microprocessor address bus (110) but receives a translated physical start_address. In our example, the translated start_address is 03000H because the interrupt signal INT1 of peripheral chip 1 (210) is replacing the address bit A13 and the address bit A12 is equal to 1. This operation occurs when microprocessor (100) outputs the address 01000H which is the start_address of its interrupt routine;

in the same way, if the interrupt signal of peripheral chip 2 (200) is activated, the memory address bus (112) does not receive the four bits of the microprocessor address bus (110) but a translated physical start_address. The translated start_address is 05000H because the interrupt signal INT2 of peripheral chip 2 (200) is replacing the address bit A14 and the address bit A12 is equal to 1; and if both the interrupt signals of peripheral chips 1 and 2 (210,200) are activated, the memory address bus (112) receives a translated physical start_address which is 07000H because the address bit A12 is equal to 1 and the interrupt signals INT1 and INT2 are respectively replacing the address bits A13 and A14 are equal to 1.

In the case of N connected peripheral chips, the translated start_address will be derived from the state of the N interrupt signals which is the combination of one or a plurality of activated interrupt signals among the N interrupt signals. Each one of these N interrupt signals replaces one address bit of the microprocessor at the memory level. The address bits A12–15 is extended to a certain number of bit addresses depending on the number N of peripheral chips.

Figure 6:
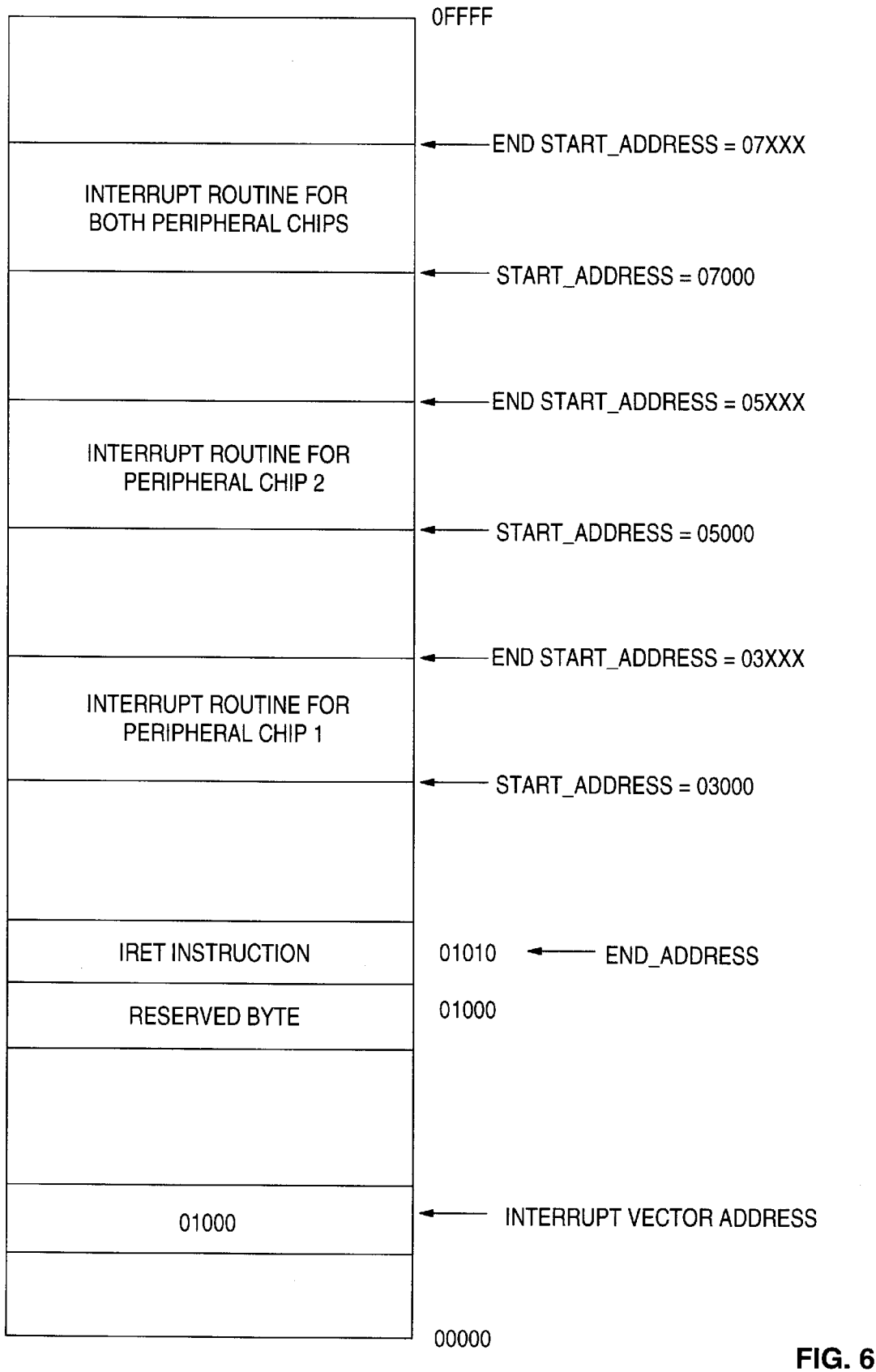
FIG. 6 represents a memory structure with interrupt routines corresponding to the case of two connected peripheral chips.

FIG. 6 describes this RAM (150) organization. The microprocessor interrupt vector is initialized at power up by the microprocessor (100) with the start_address 01000H in our example. This start_address is further decoded by hardware to detect the start of the interrupt routine. Many cases occur:

The start_address 01000H becomes a reserved word not to be used elsewhere in the code;

The last instruction of each interrupt routine for any peripheral chip is a jump to an specific address called end_address. This end_address located at 01010H (in our example) in the RAM (150) is initialized at power up by the microprocessor with an IRET (return from interrupt) instruction code. This end_address is further decoded by hardware to detect the end of the interrupt routine; and When both peripheral chips raise their interrupt signals simultaneously, the interrupt routine starts at address 07000H. In this case, the user prioritizes the treatment of one of these two interrupts depending on the application.

In the case of N connected peripheral chips, the RAM contains a maximum of (2**N-1) interrupt routines. The last instruction of each one of these interrupt routines must be a jump to the same end_address which is 01010H as in our example.

Figure 7:
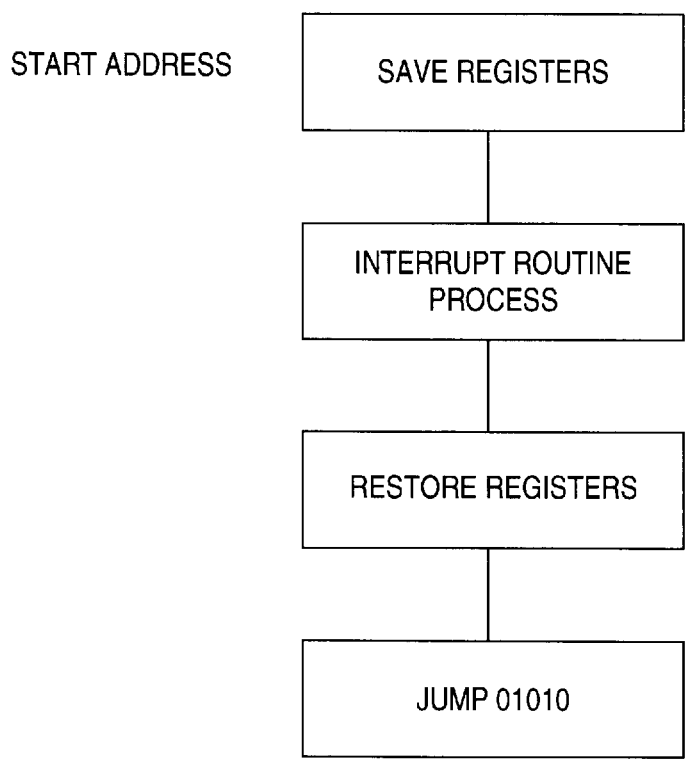
FIG. 7 shows an interrupt routine format.

FIG. 7 describes the format of each interrupt routine which is applicable whatever the number N of peripheral chips:

The first instruction is used for saving microprocessor internal registers;

Then the code deals with the interrupt routine process depending on the application; and At the end of the interrupt routine process, the registers are restored and the interrupt routine jumps to the end_address which is 01010H in our example to execute its IRET (return from interrupt) last instruction.

From a hardware standpoint, the interrupt operations take place as follows by referring to FIGS. 3-A and 3-B. Let's assume that peripheral chip (210) needs to communicate with microprocessor (100). To perform this, it activates its interrupt signal on lead (174) through pin INT1.

Microprocessor (100) detects this activated signal through OR gate (220) on its input pin INT. Then, it starts a memory read operation to get the start_address of the interrupt routine.

Figure 8:
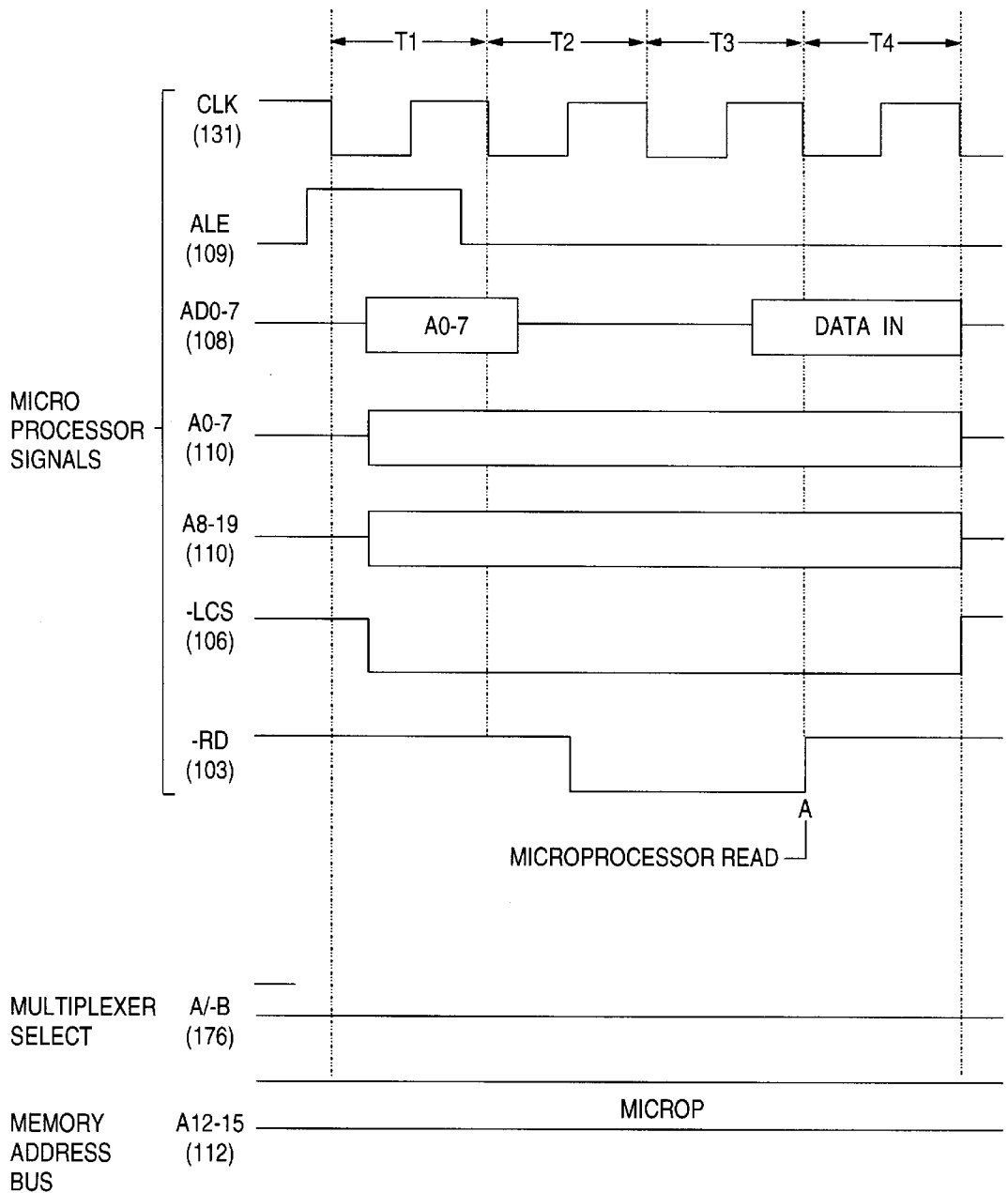
FIG. 8 shows a memory read timing.

FIG. 8 gives the memory read timing which describes the following operations:

Microprocessor (100) activates the address_strobe signal on lead (109) during a first microprocessor clock period T1 and outputs the interrupt vector address on address bus A0–19 (110). This address is internally decoded by the microprocessor which activates the address_decode signal on lead (106) corresponding to RAM (150) access;

The lower byte of the address is actually located onto the microprocessor address/data multiplexed bus AD0–7 (108) and remains on this bus during a first clock period T1. This byte is latched into latch (120) on the falling edge of address_strobe signal on lead (109). Therefore, the address located on bus (110) is steady during the entire read cycle;

At power up, latch (170) outputs are cleared then the port_select input pin A/-B of multiplexer (160) enables port B. The output port OUT12–15 of multiplexer (160) connected to the memory address bus (112) is internally connected to input port B12–15 and therefore the microprocessor upper address nibble A12–15 is transmitted to RAM (150);

Microprocessor (100) activates its read signal -RD on lead (103) during a second and third clock periods T2 and T3; and When the RAM (150) detects the activation of the local_chip_select signal on lead (106) and the read signal on lead (103), it outputs the contents of its address location on microprocessor address/data multiplexed bus (108)

that is to say 01000H. This data is read by microprocessor 100 on the rising edge of its read signal -RD on lead (103). The read operation being completed, microprocessor (100) disactivates its address decode signal -LCS on lead (106) during a fourth clock period T4.

Once the microprocessor (100) has read 01000H which is the start_address of its interrupt routine, it performs another memory read operation to execute the code located at address 01000H.

Figure 9:
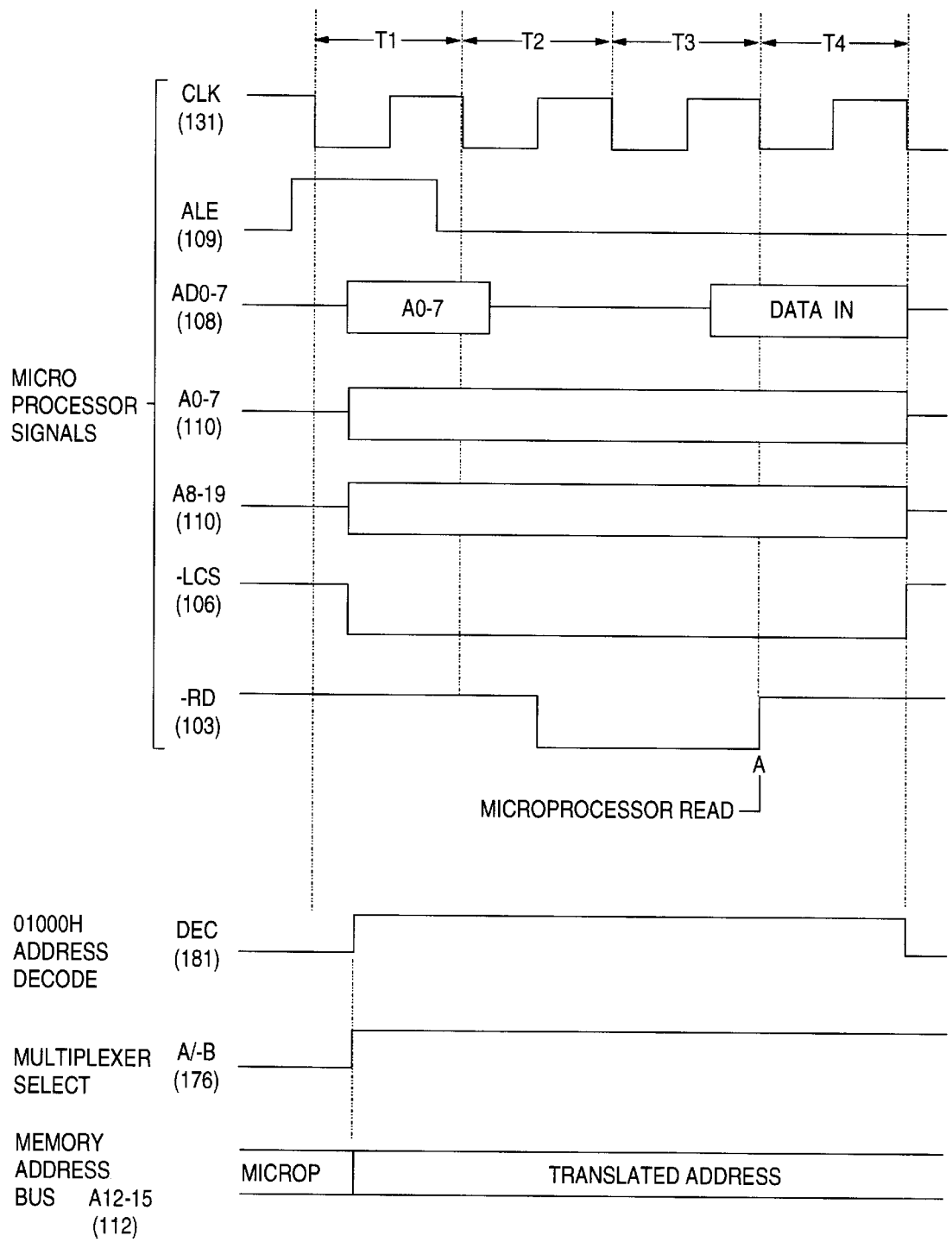
FIG. 9 shows a timing of address decode 1 according to the present invention.

FIG. 9 describes the timing of the read operation performed by the microprocessor to execute its interrupt routine corresponding to peripheral chip 1 (210). The only difference with the previous memory read timing is the use of address_decode_1 logic (180). The read operation is as follows:

The address_decode_1 logic decodes the address 01000H and generates a DEC pulse on lead (181);

This lead (181) being connected to the strobe input STB of latch (170), the outputs of this latter are switched on the rising edge of DEC signal. The output leads of bus OUT0–3 (175) are respectively latching the input IN0 connected to the microprocessor address bit A12, input IN1 connected to peripheral interrupt lead INT1, input IN2 connected to peripheral interrupt lead INT2, and input IN3 connected to microprocessor address bit A15; The output lead OUT4 (176) is latching the input IN4 connected to a reference voltage+5V The port_select input pin A/-B of multiplexer (160) being switched to+5V, enables port A. The output port OUT12–15 of multiplexer (160) is internally connected to input port A12–15. Therefore, RAM (150) receives a translated address nibble. In our example this nibble is equal to 3 (because only INT1 signal is activated). Thus microprocessor outputs the address 01000H while the RAM receives the address 03000H; and Microprocessor (100) reads the byte located at the translated address and executes then the interrupt routine corresponding to peripheral chip (210).

This memory address translation mechanism remains active until latch (170) is cleared. This is done at the end of the interrupt routine when microprocessor (100) performs a memory read operation to execute the instruction IRET located at end_address 01010H chosen in our example.

Figure 10:
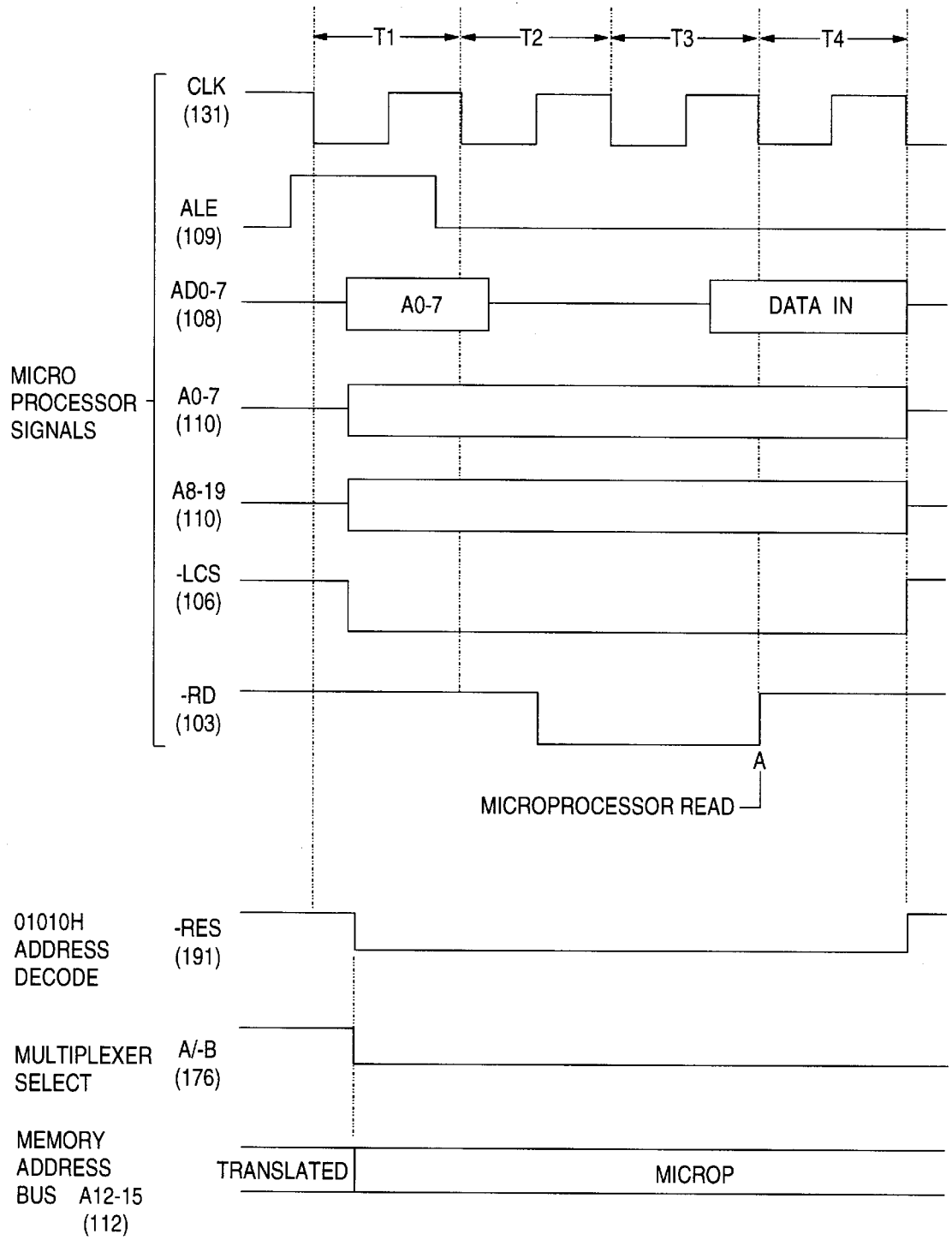
FIG. 10 shows a timing of address decode 2 according to the present invention.

FIG. 10 describes the timing of the read operation performed by the microprocessor to execute its interrupt routine corresponding to peripheral chip 2 (200). The only difference with the previous memory read timing is the use of address_decode_2 logic (190). It operates as follows:

The address_decode_2 logic decodes the end_address 01010H and generates a RES pulse on lead (191);

This lead being connected to the clear input -CL of latch (170), the outputs of this latter are reset to zero;

The port_select input pin A/-B of multiplexer (160) being switched to zero, it enables port B. The output bus OUT12–15 (112) of multiplexer (160) is then switched back to input port B12–15 and consequently, RAM (150) receives microprocessor address nibble A12–15 through port B of the multiplexer (160); and Microprocessor 100 reads the IRET instruction code located at end_address 01010H and terminates the interrupt routine.

In the case of N peripheral chips, the entire description of the timing remains the same. The only difference resides in the translated start_address which is dependent on the state of the N interrupt signals. The end_address of each interrupt routine is to be kept the same for these N peripheral chips.

We claim:

1. An interrupt device for enabling a number N of I/O devices (200,210,230) to share a common interrupt line (101) in a data communication system comprising a microprocessor (100) and a memory (150) containing a plurality of interrupt routines, being connected by data/address busses (108,110), said interrupt device receiving interrupt signals from each of said I/O devices on interrupt lines (173,174, 231); said interrupt device being characterized in that it further comprises:

interrupting means (220) for receiving any one of said interrupt signals from said I/O devices to interrupt said microprocessor (100) and getting a start_address of an interrupt operation from said memory;

a first address decoding means (180) decoding said start_ address (01000H) on address bus (110) for generating a decoding signal (DEC,181);

a second address decoding means (190) decoding an end_address (0010H) of said interrupt routines from said memory (150) for generating a resetting signal (RES,191);

an interrupt control means (170) responsive to any one of said interrupt signals and to said decoding signal (181) for generating a select signal (176) and a translated address on a translated address bus (175) for initializing the corresponding interrupt routines, and responsive to said resetting signal (191) for resetting said translated address bus (175) for ending the interrupt routines; and switching means (160) responsive to said select signal (176) for switching between said translated address received on said translated address bus (175) and unchanged microprocessor address received on address bus (110) so as to transmit it to said memory (150) to read the interrupt routine at the translated address or the microprocessor address.

2. The interrupt device as set forth in claim 1 wherein the translated addresses are determined by association of a base address bus (171,172) of said data/address bus (110) and said N interrupt lines (173,174,231) activated according to N interrupt signals.

3. The interrupt device as set forth in claim 2 wherein the number of translated addresses which are interrupt routine start_addresses stored in the memory (150) depend on the combination of the N input/output devices.

4. The interrupt device as set forth in claims 1 or 2 wherein all interrupt operations requested by said I/O devices has a common start_address code (01000H).

5. The interrupt device as set forth in claims 1 or 2 wherein said end_address (01010H) of the interrupt routines is a common code for all interrupt operation requested by said I/O devices.

6. The interrupt device as set forth in claim 1 to which are respectively connected through interrupt lines (173,174) a first and second I/O devices (210,200) which are sharing said common interrupt line (101), and wherein said interrupt control means (170) receives base address lines (171,172) of data/address bus (110) and interrupt lines (173,174) from said first and second devices (200) to generate a translated address of at least three bits to said switching means (160) on said address translated bus (175).

* * * * *